United States Patent

[11] 3,628,812

[72] Inventors Edward Larralde
  Santa Barbara;
  Ronald A. Weber, Ojai; James W. E.
  Hanes, Ventura; Thomas W. Childers,
  Woodland Hills, all of Calif.
[21] Appl. No. 881,022
[22] Filed Dec. 1, 1969
[45] Patented Dec. 21, 1971
[73] Assignee Esso Production Research Company

[54] REMOVABLE PIPE CONNECTOR
  23 Claims, 6 Drawing Figs.
[52] U.S. Cl. ................................................ 285/24,
  285/93, 285/315, 285/322, 285/334.2, 285/351,
  285/364
[51] Int. Cl. ..................................................... F16l 35/00
[50] Field of Search ............................................ 285/18, 24,
  86, 27, 93, 331, 351, 334.2, 364 RC, 315, 3, 322,
  4, 316, 26, 29; 166/0.6; 294/86.3, 86.32, 100, 102

[56] References Cited
  UNITED STATES PATENTS
  2,915,325  12/1959  Foster ........................... 285/351 X
  3,141,685  7/1964   Watts ............................ 285/331 X
  3,220,245  11/1965  Van Winkle .................. 285/93 X
  3,492,027  1/1970   Herring ......................... 285/315 X
Primary Examiner—Dave W. Arola
Attorneys—Thomas B. McCulloch, Timothy L. Burgess,
  Melvin F. Fincke, John S. Schneider, Sylvester W. Brock,
  Jr. and Kurt S. Myers ABSTRACT: A connector for joining the ends of two pipes or flow lines. A hub member is connected to the end of each pipe. Each hub member has sealing surfaces which effect a closure between the mated hub members. A plurality of expandable-contractible hub-locking fingers are slidably arranged on one of the pipes to engage the hub members and lock them together. A slidable sleeve is arranged about the locking fingers to engage and collapse them in such a manner as to cause the hubs to mate to effect a closure for fluids contained under pressure in the pipes without leakage. The locking fingers hold the hub members in a sealed position until the locking fingers are driven to an unlocked position. The locking fingers act as a guide to align the hubs when drawn together so as to readily effect a sealed closure between the pipes. Means is provided for supplying a test fluid under pressure to the closure to allow testing thereof for pressure integrity prior to applying flowline pressures.

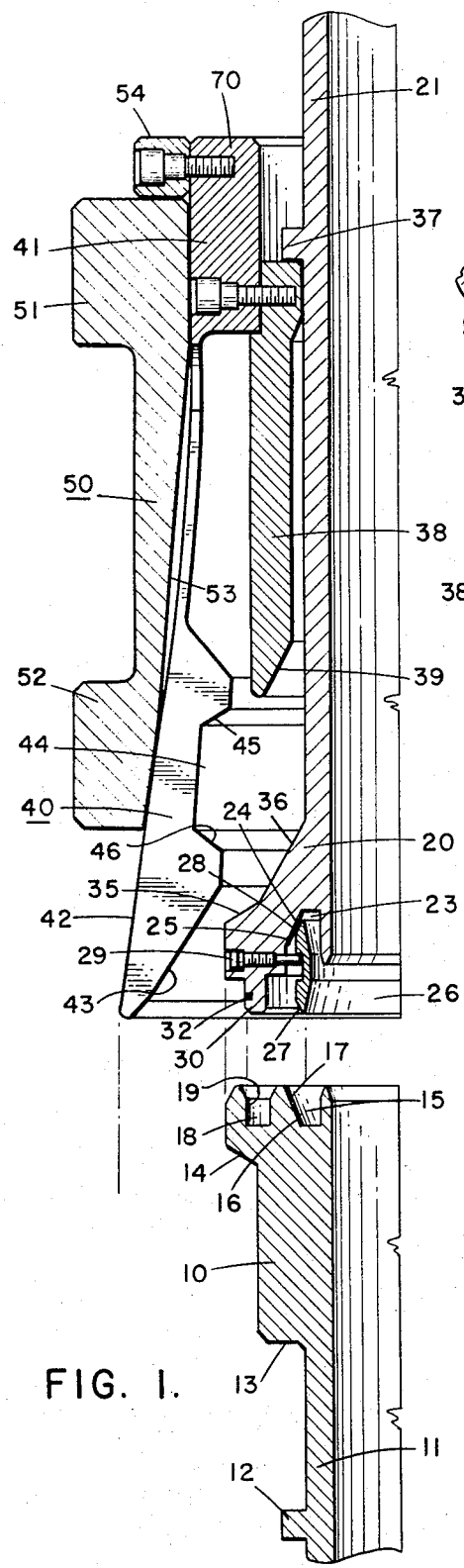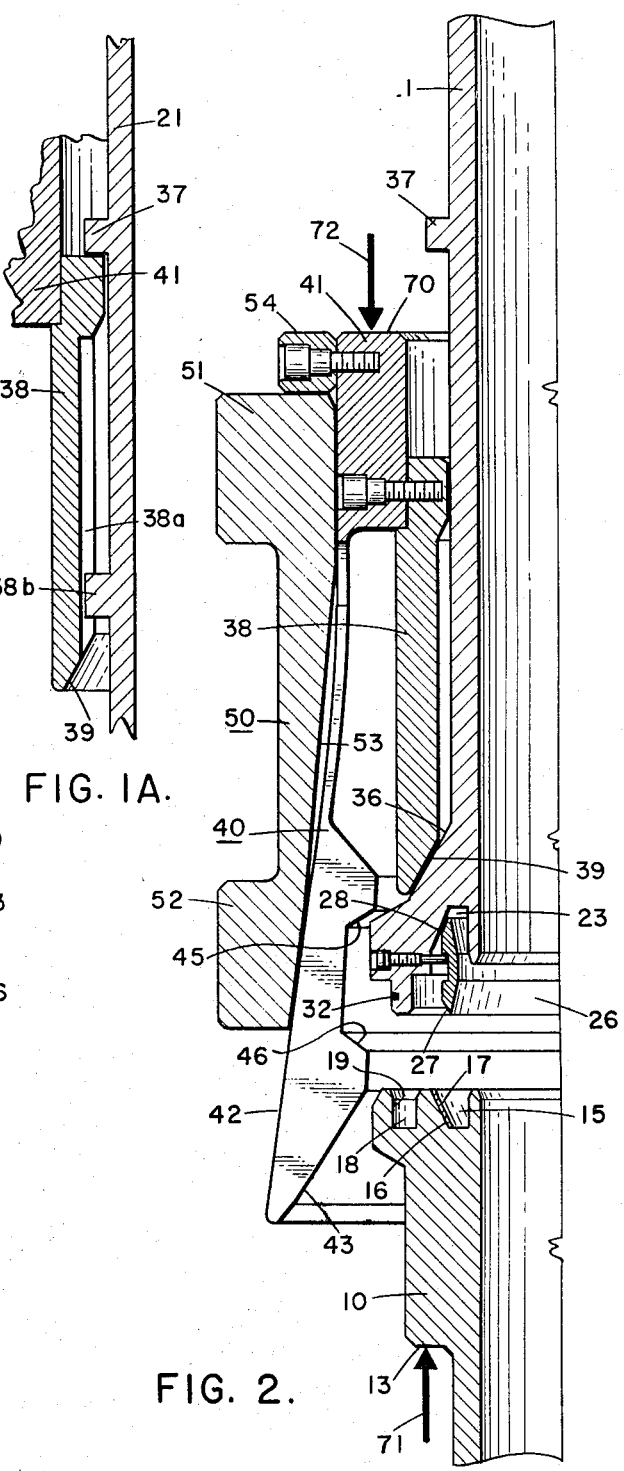
FIG. 1.
FIG. 1A.
FIG. 2.
INVENTORS.
EDWARD LARRALDE,
RONALD A. WEBER,
JAMES W. E. HANES,
THOMAS W. CHILDERS,
BY John S. Schneider
ATTORNEY.

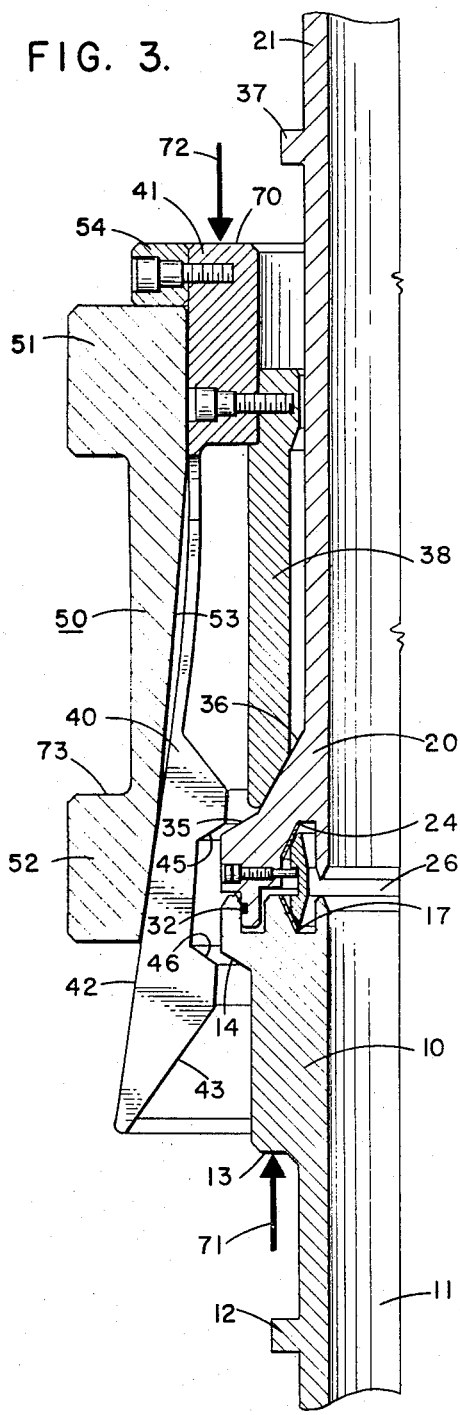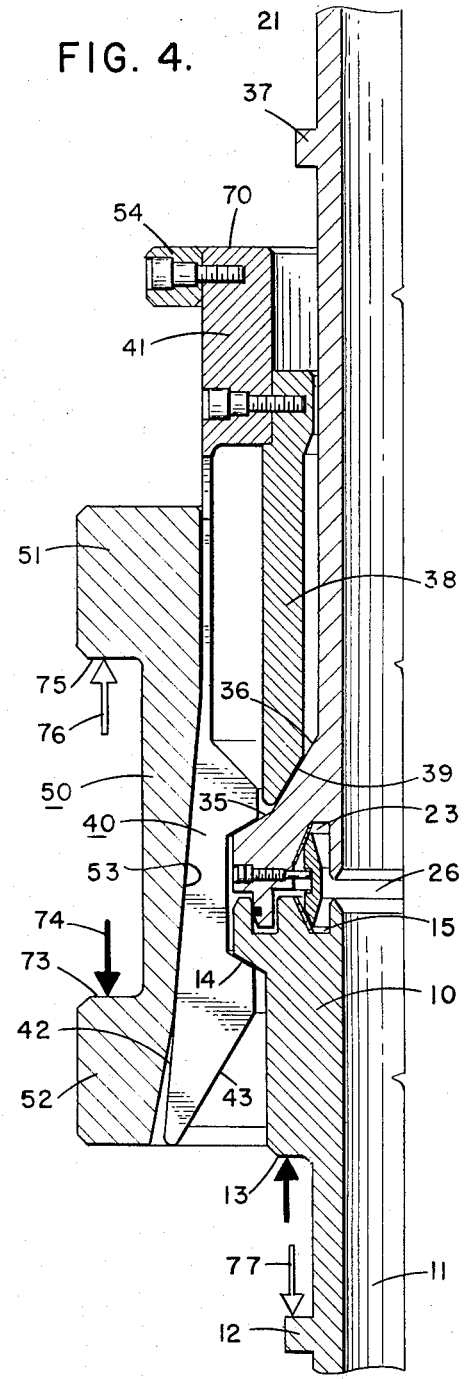

INVENTORS.
EDWARD LARRALDE,
RONALD A. WEBER,
JAMES W. E. HANES,
THOMAS W. CHILDERS,

BY John S. Schneider
ATTORNEY.

REMOVABLE PIPE CONNECTOR

BACKGROUND OF THE INVENTION

The present invention relates to connectors used to join sections of pipe or flow line systems, particularly when such connections are to be made under water as in the completion of subaqueous oil and gas wells. These pipe sections or flow line systems are for use in the completion of subaqueous oil or gas wells in water depths or marine environments which preclude the efficient use of divers.

The connector is capable of being made up or disassembled through axial movement of the separate mating halves of the connector. These halves may be positioned prior to assembly with some distance of space separating them. The connector also has the inherent capability of correcting considerable axial and angular misalignment in the process of connecting the pipes together.

SUMMARY OF THE INVENTION

A releasable connector for aligning, joining, sealing, and locking the ends of two pipes comprising first- and second-mating hub members. The first hub member is connected to one of the pipes and is provided with an external shoulder and an outer projecting annular sealing member and an inner annular recess which contains a ring seal. The second hub member is connected to the other pipe and is provided with an external shoulder and an outer annular seal recess and an inner annular recess which contains a ring seal. A plurality of expandable-contractable locking fingers each provided with an internal recess are arranged for engagement with said hub members. Means are provided for locking the locking fingers on said mated hub members. A seal member is provided within the annular recesses in said hub members for engaging the ring seals. Means are provided for supplying a test pressure between the inner annular recess and the outer projecting annular sealing member of the first hub member to allow testing of the sealing surfaces for pressure integrity prior to applying internal pipe pressure.

BRIEF DESCRIPTION OF THE DRAWINGS

FIG. 1 is a view of the connector embodying the invention illustrating the components of the connector disassembled;

FIG. 2 is a view similar to that shown in FIG. 1 and illustrates means for correcting misalignment of the connector components;

FIG. 3 is another view similar to that shown in FIG. 1 and illustrates mating of the connector components after alignment has been achieved;

FIG. 4 is another view similar to that shown in FIG. 1 and illustrates the manner in which the slidable-locking fingers are constricted, thus locking the hub members in the closed portion;

DESCRIPTION OF THE PREFERRED EMBODIMENTS

Figure 5:
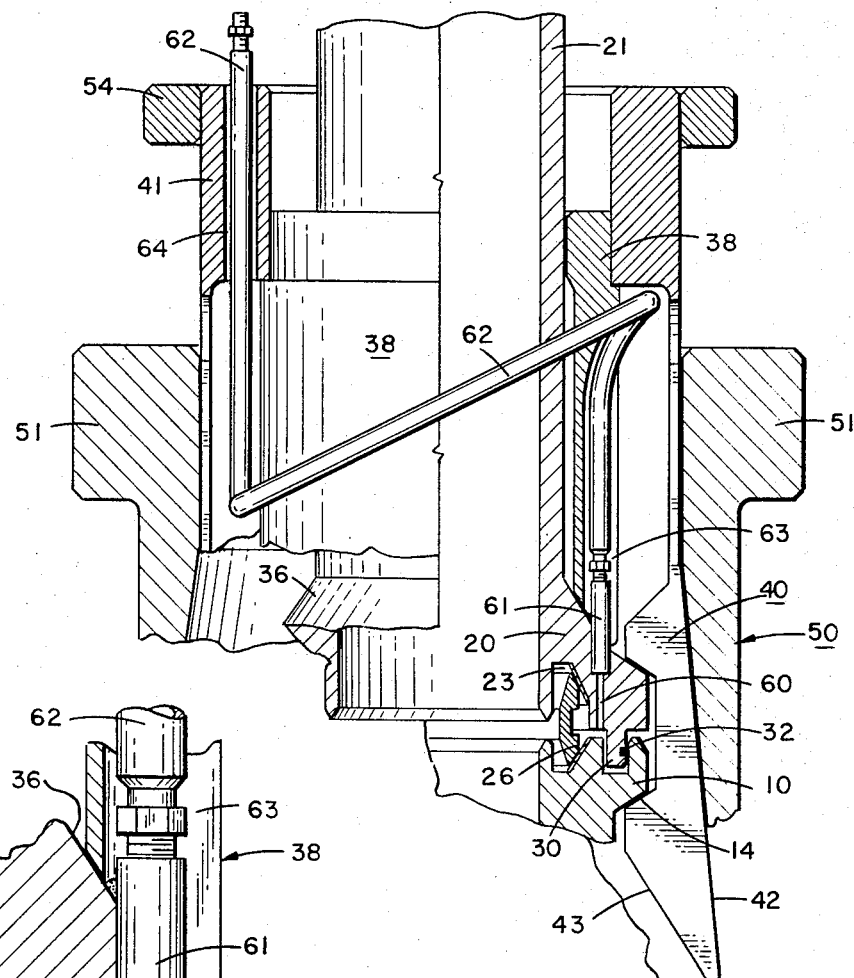
FIG. 5 is a view of the connector embodying the invention illustrating means for supplying test pressure between the seals when the hub components are locked together.

Referring to the drawings, there is shown a hub member 10 integrated as by welding to a pipe or flow line 11 on which is formed an annular shoulder 12. Hub member 10 is formed with a shouldered surface 13 and a tapered shouldered locking surface 14. Hub member 10 also has formed on the end thereof an inner annular recess 15 having an outer slanted surface 16 which may be provided with sealing material 17 and an outer annular recess 18 having an outer sealing surface 19 (see FIG. 6 in particular).

Another hub member 20 is integrated as by welding to a pipe or flow line 21. The exposed end of hub 20 is provided with an inner annular recess 23 having an outer slanted surface 24 which may be provided with sealing material 25. A crescent-shaped annular seal member 26 having end sealing surfaces 27 and 28 for engagement with, respectively, sealing material 17 and 25 is retained and supported in recess 23 by four (more or less) bolts 29 extending through the wall of hub 20. Sealing material 17 covering surface 16 of hub member 10 and sealing material 25 covering surface 24 of hub member 20 are stainless steel rings which are bonded to the respective surfaces such as by welding. These rings 17 and 25 act as sealing surfaces and protect surfaces 16 and 24 from corrosion. However these rings are not functionally required as the crescent-shaped seal ring 26 may seat directly against slanted surfaces 16 and 24. An outer annular lug projection 30 is formed on the end of hub 20. The outer surface 31 of lug 30 contains an O-ring seal 32 which is designed to engage sealingly surface 19 of recess 18 in hub 10. Hub 20 is formed with a tapered shouldered locking surface 35 and a tapered shouldered stop surface 36.

A stop ring 37 is affixed to pipe 21. A movable cylindrical sleeve 38 is arranged about pipe 21 between stop surface 36 and stop ring 37. The lower end surface 39 of sleeve 38 is tapered to substantially the same degree as stop surface 36. The inner surface of the sleeve 38 is slotted as at 38a to engage a lug 38b on pipe 21 (as shown in FIG. 1A) to prevent rotation of the sleeve. A plurality of spring expandable, contractable-locking fingers 40 are bolted to sleeve 38 through an upper collar 41 formed on fingers 40. Fingers 40 are formed with externally tapered surfaces 42 and internal conically shaped end surfaces 43. A recess 44 formed on the inner surface of each locking finger has upper and lower tapered walls 45 and 46 for mating engagement with locking surface 35 on hub 11 and locking surface 14 on hub 11 and locking surface 14 on hub 10, respectively. A movable cylindrical housing 50 having spaced-apart collars 51 and 52 and an inner tapered surface 53 surround locking fingers 40. A stop ring 54 is bolted to collar 41.

Figure 6:
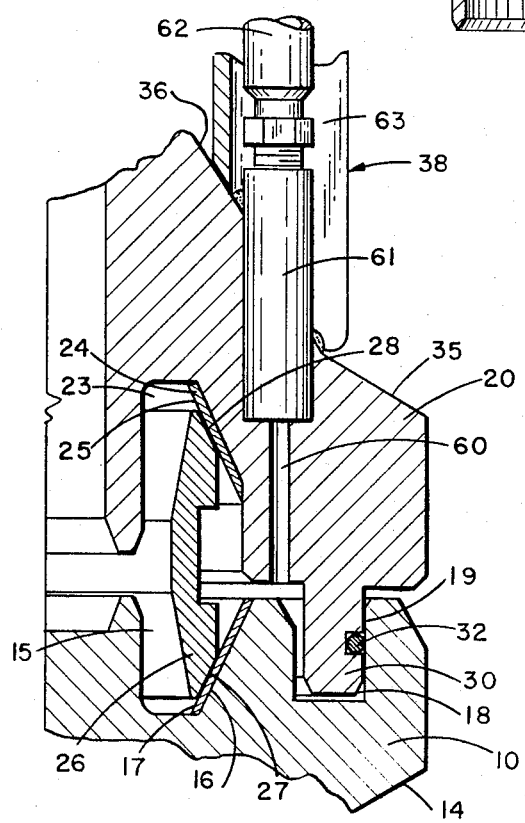
FIG. 6 is an enlarged view of a portion of FIG. 5.

As seen in FIGS. 5 and 6, a fluid passageway 60 formed in hub 20 terminates at one end between recess 23 and lug 30 and at its other end in a suitably threaded tubular fitting 61 which is connected by a hose or tube 62 to an external source of pressure, not shown. Tube 62 extends from fitting 61 through a slot 63 cut-in sleeve 38 to accommodate tube 62 and through an opening 64 formed in collar 41.

In operation, when it is desired to connect or couple the end of pipe section 21 (with attached hub 20) and pipe section 11 (with attached hub 10) an axially operating actuator (not shown) directs force against shouldered surface 13 on hub 10 and shouldered surface 70 on collar 41 in the direction indicated by the arrows 71 and 72, respectively. As seen in FIG. 2, locking fingers 40 are driven toward hub 10. The inside conical surfaces 43 act as a guide to direct hub 10 into a position of axial concurrence as hubs 10 and 20 are drawn together by the axially energized actuator, to culminate in a mated position with respect to one another as illustrated in FIG. 3. Lug 30 serves as a boss to protect sealing member 26 and to provide final axial alignment of hubs 10 and 20 before seal member 26 engages sealing surfaces 16 and 24 in its sealing position. Cylindrical sleeve 38 moves toward hub 10 along with collar 41 of locking fingers 40 until surface 39 engages stop surface 36. Applying axial force to face 73 of collar 52 of cylindrical housing 50 in the direction of arrow 74, slidably engages the external taper 42 of locking fingers 40 on the internal taper 53 of housing 50 inherently collapsing expandable locking fingers 40 so as to engage surfaces 45 and 46 of recess 44 with surface 35 of hub 20 and surface 14 of hub 10, respectively, as seen in FIG. 4. In this position of hubs 10 and 20, surfaces 27 and 28 of sealing member 26 engage sealing surface 17 and 25, respectively, In addition, sealing ring 32 engages surface 19 of recess 18.

Prior to introducing fluids or gases under pressure in pipes 11 and 21, the pressure integrity of the seals formed by sealing member 26 and O-ring 32 may be measured and assured by applying pressure through hose 62, tubular fitting 61 and passageway 60.

When it is desired to disconnect hubs 10 and 20, pressure is exerted on face 75 of collar 51 in the direction of arrow 76 and on shoulder 12 in the direction of arrow 77 to slidably release contact between tapered surfaces 42 and 53, thereby allowing expandable-locking fingers 40 to move into the expanded position and release engagement between hubs 10 and 20. Further axial movement resulting from continued pressure on collar 51 and shoulder 12 in the direction of arrows 76 and 71, respectively, withdraws hubs 10 and 20 (and pipes 11 and 12) from the mating positions thereof and completes the disengagement.

Having fully described in the apparatus, objects, advantages and operation of our invention, we claim:

1. A connector for releasably joining the ends of two pipes together comprising: first and second mateable hub members;
   said first hub member being attached to an end of one of said pipes and having an external locking shoulder, an inner annular recess containing an outer sealing surface and an outer lug member having a seal ring arranged on the outer surface thereof;
   said second hub member being attached to an end of the other of said pipes and having an external locking shoulder, an inner annular recess containing a sealing surface, and an outer annular recess containing an outer sealing surface wall;
   an annular seal member having sealing surfaces for engaging the sealing surfaces of said inner annular recesses of said hub members;
   said outer lug member entering said outer annular recess in said second hub member to provide final axial alignment before said annular seal member engages said sealing surfaces of said inner annular recesses of said hub members in sealing positions;
   a stop sleeve slidably arranged on said one pipe adjacent said first hub member;
   a plurality of spring expandable, contractable locking fingers secured to and movable with said cylindrical stop member, said locking fingers having conically shaped inner end surfaces which taper outwardly in a direction toward the ends thereof, inner recesses having wall surfaces for engagement with the external shoulders of said first and second hub members, and outer tapered surfaces; and
   a housing slidable arranged on said locking fingers for holding said fingers in locked position on said mated hub members, said housing having an inner surface for engaging the outer surfaces of said locking fingers.

2. A connector as recited in claim 1 in which said first hub member is formed with an external slanted sleeve stop surface, the lower end of said stop sleeve being slanted to the same extent as said sleeve stop surface on said hub member for engagement therewith.

3. A connector as recited in claim 2 including an annular stop ring connected to said one pipe to limit movement of said stop sleeve in a direction away from said first hub member.

4. A connector as recited in claim 3 including a housing stop member secured to said locking fingers to maintain said housing arranged on said locking fingers.

5. A connector as recited in claim 4 including an actuator shoulder arranged on said other pipe for engagement with an axial actuator to move said second hub member towards and away from said first hub member;
   said fingers having a collar, one surface of which engages an axial actuator for moving said fingers and attached sleeve along said one pipe;
   said housing being provided with spaced-apart shoulder having surfaces for engagement with axial actuators for moving said housing along said fingers.

6. A connector as recited in claim 5 in which said sealing member is formed crescent shaped and initially retained in said annular recess on said first hub member.

7. A connector as recited in claim 6 including a passageway formed in said first hub member terminating between annular recess and said lug member at one end and in a tube connected to a source of fluid pressure at the other end, said tube extending through said locking fingers collar, said stop sleeve having a groove formed therein to accommodate said tube.

8. A connector as recited in claim 7 in which said lug member extends over and thereby protects said annular seal member.

9. A connector for releasably joining ends of two pipes together comprising: first and second mateable hub members;
   said first hub member being attached to an end of one of said pipes and having an external locking shoulder and an inner annular recess containing an outer sealing surface and an outer lug member having a seal ring arranged on the outer surface thereof;
   said second hub member being attached to an end of said other pipe and having an external locking shoulder, an inner annular recess containing a sealing surface, and an outer annular recess containing an outer sealing surface wall;
   an annular seal member having sealing surface for engaging the sealing surfaces of said inner annular recesses of said hub members;
   said outer lug member entering said outer annular recess of said second hub member to provide final axial alignment before sealing surfaces of said annular seal member engage said sealing surfaces of said inner annular recesses of said hub members in sealing positions;
   a plurality of expandable- and contractable-locking fingers axially slidable on said first hub member from a retracting to an extended position and vice versa, each locking finger having an inner end surface which tapers outwardly in a direction toward the end thereof, an inner recess having wall surfaces for engagement with the external shoulder surfaces of said first and second hub members and an outer tapered surface, said inner recess being located away from said external-locking shoulder on said first hub member in an axial direction in said retracted position of said finger, said inner end surfaces functioning to guide said second hub member into a position of approximate axial concurrence with said first hub member when said fingers are in said extended position and said hub members are being drawn together; and
   means slidably arranged on said locking fingers for contracting and holding said fingers in locked position on said mated hub members.

10. A connector as recited in claim 9 including an actuator shoulder arranged on said other pipe for engagement with an axial actuator to move said second hub member towards and away from said first hub member;
    said fingers having a collar, one surface of which engages an axial actuator for moving said fingers along said one pipe;
    said means slidably arranged on said locking fingers being provided with spaced-apart shoulders having surfaces for engagement with axial actuators for moving said means along said fingers.

11. A connector as recited in claim 10 in which said seal member is formed crescent shaped and initially retained in said annular recess on said first hub member.

12. A connector as recited in claim 11 including a passageway formed in said first hub member terminating between said annular recess and said lug member at one end and in a tube connected to a source of fluid pressure at the other end, said tube extending through said locking fingers collar.

13. A connector as recited in claim 12 in which said lug member extends over and thereby protects said annular seal member.

14. A connector comprising first and second mateable hub members:
    said first hub member having an external-locking shoulder, a sealing surface and a lug member;
    said second hub member having an external-locking shoulder, a sealing surface and an annular recess;

an annular seal member having sealing surface for engaging the sealing surfaces of said hub members;

said lug member entering said recess in said second hub member to provide final axial alignment before said annular seal member engages said sealing surfaces of said hub members in sealing position;

a plurality of expandable- and contractable-locking fingers axially slidable on said first hub member, each locking finger having an inner end surface which tapers outwardly in a direction toward the end thereof, an inner recess having wall surfaces for engagement with the external shoulder surfaces of said first and second hub members and an outer tapered surface, said inner recess being located away from said external-locking shoulder on said first hub member in an axial direction in one position thereof, said inner end surfaces functioning to guide said second hub member to a position of approximate axial concurrence with said first hub member when said hub members are being drawn together; and means slidably arranged on said locking fingers for holding said fingers in locked position on said mated hub members.

15. A connector comprising first and second mateable hub members:

said first hub member having a locking surface, a sealing surface and a lug member;

said second hub member having a locking surface, a sealing surface and an annular recess;

an annular seal member having sealing surfaces for engaging the sealing surfaces of said first and second hub members;

said lug member entering said annular recess of said second hub member to provide final axial alignment before said annular seal member engages said sealing surfaces of said hub members in sealing positions;

a plurality of expandable- and contractable-locking fingers axially movable on said first hub member, each locking finger having an inner end surface which tapers outwardly in a direction toward the end thereof and locking surfaces engageable with said first and second hub member locking surfaces, said locking surfaces on said fingers being located away from the locking surface on said first hub member in an axial direction in one position thereof, said inner end surfaces functioning to direct said first hub member toward axial concurrence with said hub member when said hub members are being drawn together; and means slidably arranged on said locking fingers for holding said fingers in locked position on said mated hub members.

16. A connector as recited in claim 15 including a sealing wall in said annular recess, a seal member arranged on the outer surface of said lug member and sealing against said sealing wall of said annular recess when said lug member is positioned within said annular recess.

17. A connector as recited in claim 16 including a passageway formed in said first hub member terminating at one end thereof between said sealing surfaces of said first hub member and s aid lug member and at the other end thereof in a tube connected to a source of fluid pressure.

18. A connector comprising:

two cylindrical hub members capable of being drawn to and withdrawn from each other in an axial direction for connection and disconnection of the ends thereof;

a plurality of expandable and contractable fingers slidably arranged on one of said hub members for axial movement from a retracted position to an extended position in which the ends of said fingers extend beyond the end of said one hub member and vice versa;

said fingers having inner end surfaces tapering outwardly in a direction toward the ends thereof;

said end surfaces functioning to direct said other hub member toward axial with said one hub member when said hub members are being drawn together;

sealing means located on the ends of said hub members cooperating to seal off the connection between said hub members when said hub members are drawn together into mating relationship; and means located on the ends of said hub members cooperating to protect said sealing means as said hub members are drawn together and to provide final axial alignment of said hub members before said sealing means is in sealing position.

19. A connector as recited in claim 18 in which the ends of said fingers are about coextensive with the end of said one hub member when said fingers are in retracted position.

20. A connector as recited in claim 19 wherein said sealing means comprises an annular recess in said first hub member having a sealing surface and an annular recess in said second hub member having a sealing surface and an annular seal member having sealing surfaces for engaging the sealing surface of said recesses in said first and second hub members.

21. A connector as recited in claim 20 wherein said means cooperating to protect said sealing means and to provide final axial alignment of said hub members comprise a lug member arranged on the end of said one hub member and a mating recess arranged on the end of said other hub member.

22. A connector as recited in claim 21 including means slidable axially on said fingers from one position in which said fingers are expanded to another position in which said fingers are contracted to lock said mated hub members together when said slidable means is in said other position.

23. A connector comprising:

two cylindrical hub members capable of being drawn to and withdrawn from each other in an axial direction for connection and disconnection of the ends thereof;

a plurality of expandable and contractable fingers slidably arranged on one of said hub members for axial movement from a retracted position to an extended position in which the ends of said fingers extend beyond the end of said one hub member and vice versa;

said finger having inner end surfaces tapering outwardly in a direction toward the ends thereof;

said end surfaces functioning to direct said other hub member toward axial concurrence with said one hub member when said hub members are being drawn together; and sealing means located on the ends of said hub members cooperating to seal off the connection between said hub members when said hub members are drawn together into mating relationship.

* * * * *